Nov. 5, 1968  H. D. CURRENCE  3,408,797
HARVESTING DEVICE
Filed June 17, 1965  2 Sheets-Sheet 1
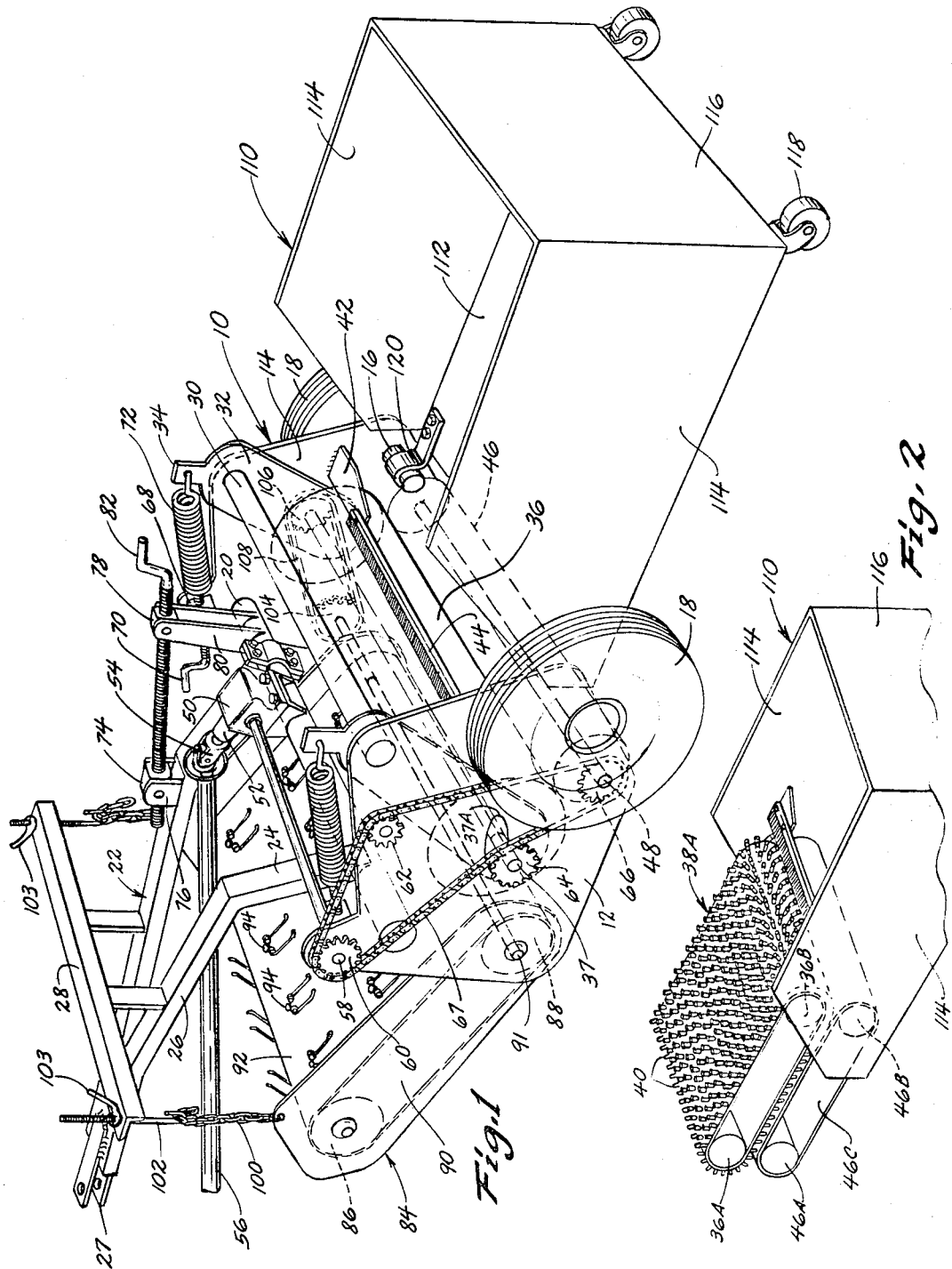
INVENTOR
HOWARD D. CURRENCE
BY Dick, Zarley, McKee & Thomte
ATTORNEYS

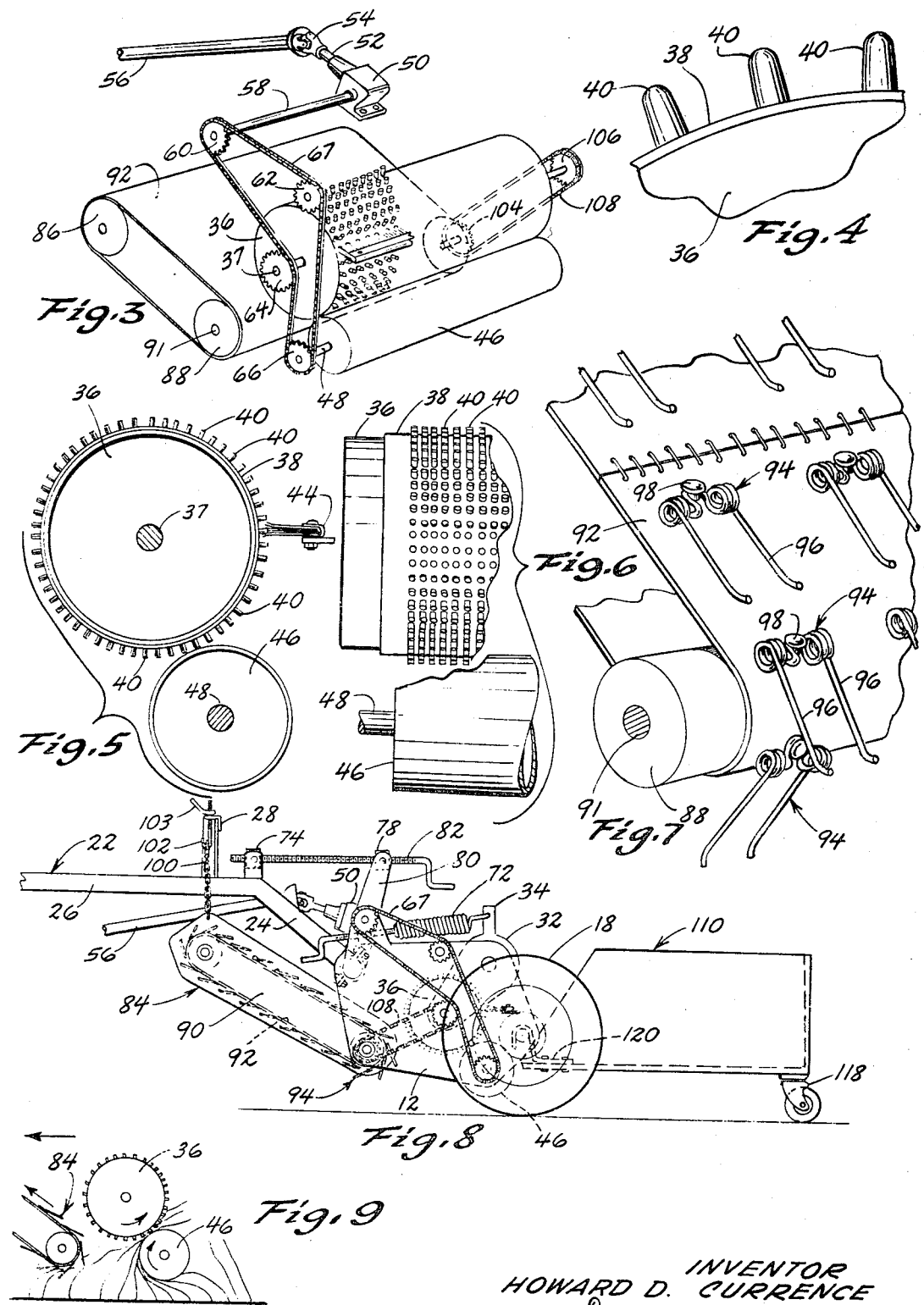

United States Patent Office 3,408,797
Patented Nov. 5, 1968

3,408,797
HARVESTING DEVICE
Howard D. Currence, Ames, Iowa, assignor to Iowa State University, Research Foundation, Ames, Iowa, a corporation of Iowa
Filed June 17, 1965, Ser. No. 464,776
18 Claims. (Cl. 56—19)

ABSTRACT OF THE DISCLOSURE

A harvesting device contains a wheel mounted frame means, a first roll extending transversely across the frame and rotatably mounted thereon, a plurality of finger elements extending from the first roll, a second roll extending transversely across the frame and being positioned adjacent the peripheral ends of the finger elements, and means for rotating the rolls.

---

It has been determined that the leaves of alfalfa and the like have high nutrient value as animal feeds, but the removal of the leaves from the alfalfa plant presents several difficult problems. First of all, the alfalfa plants are often entangled with each other which obviously inhibits the collection of the leaves with any automated equipment. In addition, it is desirable to not injure the stem of the alfalfa plants as the leaves are removed so that new leaves and further growth of the alfalfa can take place after the original leaf harvesting operation is completed. Also, for purposes of future growth, it is important that the leaf collection operation in all respects preserve the alfalfa plant, and it is therefore imperative that the alfalfa plant not be removed from the ground during the leaf harvesting function.

While the preservation of the stalk of the plant is perhaps less important in the harvesting of small grains and the like, it is always desirable to be able to cleanly remove the grain from a stalk or stem without also including portions of the plant which ultimately must be removed from the harvested seeds.

Therefore, it is a principal object of this invention to provide a harvesting device that will cleanly gleam the leaves or grain from a growing crop without adversely affecting the plant from which the leaves or grain have been removed.

A further object of this invention is to provide a harvesting device that will comb and straighten an entangled growing crop for purposes of then removing grain or leaves from such crop.

A further object of this invention is to provide a harvesting device which can be successfully used on crops of different plant heights.

A still further object of this invention is to provide a harvesting device that will efficiently collect the leaves or grain that have been removed from the plant without experiencing any wastage thereof.

A still further object of this invention is to provide a harvesting device that can have its key operational components adjustably secured with respect to each other to accommodate variations in crops and other conditions.

A still further object of this invention is to provide a harvesting device that is economical of manufacture, durable in use, and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

FIGURE 1 is a rearward perspective view of the device of this invention;
FIGURE 2 is a partial perspective view of a portion of an alternate form of this invention;
FIGURE 3 is a schematic view of the power train of the device of this invention showing how the moving parts thereof are operated;
FIGURE 4 is a partial elevational view of the upper roll of the device of this invention;
FIGURE 5 is a schematic view of the upper and lower rolls of the device of this invention showing their operational relationship;
FIGURE 6 is a rearward view of the upper and lower rolls shown in FIGURE 5 and further shows their positional relationship;
FIGURE 7 is a partial perspective view of the draper comb of the device of this invention which functions to straighten the entangled crop which is being harvested;
FIGURE 8 is a side elevational view of the device of this invention; and
FIGURE 9 is a schematic side elevation of the upper and lower rolls and the draper comb of the device of this invention as it is moving through a crop that is being harvested.

The numeral 10 generally designates a frame which includes side plates 12 and 14. Horizontal stub axles 16 extend through each of the plates 12 and 14 at their lower rearward ends and wheels 18 are rotatably mounted on the outer ends of the axle 16.

A bar 20 extends horizontally between the forward upper portions of plates 12 and 14 and has its opposite ends pivotally secured to the plates in any convenient manner. A tongue 22 is welded to bar 20 and extends upwardly and forwardly therefrom. Tongue 22 is comprised of tongue members 24 which have their lower ends welded to bar 20, and these members 24 then extend upwardly and forwardly from the bar 20. The upper ends of tongue members 24 terminate in horizontal tongue members 26 which extend inwardly towards each other and are joined at their forward ends, which thereupon terminate in a clevis 27 which is adapted for connection to the drawbar of a prime mover. A transverse bracket 28 extends across tongue 22 as shown in FIGURES 1 and 8.

A shaft 30 extends between the upper rearward portions of plates 12 and 14 and is pivotally secured by its ends to these plates. Elongated bearing plates 32 are disposed in a plane parallel to plates 12 and 14 and are located just inwardly of the plates 12 and 14. Shaft 30 extends through the upper ends of bearing plates 32 and is rigidly secured to these plates. As shown in FIGURE 1, a lip 34 extends upwardly from the upper ends of plates 32. An upper roll 36 is rigidly secured to a shaft 37 that rotatably extends through the lower ends of bearing plates 32. The ends of shaft 37 extend through an elongated slot 37A in each of the side plates 12 and 14. A mat 38 of rubber or the like is secured in any convenient fashion to the outer periphery of roll 36. A plurality of rows of fingers 40 extend radially from mat 38 and are arranged in longitudinal rows. The fingers 40 are integral with the mat 38 and are possessed of some resiliency but at the same time offer some resistance to deflection. With reference to FIGURE 4, it should be noted that the space between rows of fingers 40 is at least as wide and preferably wider than the diameter of the fingers themselves. As will be discussed hereafter, this space between rows of fingers prevents the stems of the plants from becoming interlocked between adjacent rows of fingers, and hence prevents the breaking of the plant or its removal from the ground. Plates 42 are welded to the inner rearward portion of plates 12 and 14 and an elongated brush 44 is secured by its ends to plates 42. As shown in FIGURE 5, the brush 44 is positioned at the rearward center of the upper roll 36 and engages the periphery thereof for the purpose of cleaning any grain or leaves from the fingers 40.

A lower roll 46 is rigidly mounted on shaft 48 which in turn is rotatably mounted by its ends on side plates 12 and 14 at the lower rearward portion thereof. This serves to position the lower roll 46 rearwardly and below the upper roll 36. As shown in FIGURE 5, the lower roll 46 is normally positioned to engage the peripheral ends of the fingers 40. The lower roll 46 has a smaller diameter than the upper roll 36, and the roll 46 is comprised of steel, rubber, Teflon, or any suitable material presenting a smooth and frictionless surface to the outer tips of the fingers 40.

A gear box 50 is rigidly secured in any convenient manner to the bar 20 and an imput shaft 52 extends forwardly therefrom. A universal joint 54 serves to connect the imput shaft 52 with a power take-off shaft 56 which is operatively connected by conventional means to the power means of the prime mover being utilized. A jack shaft 58 extends laterally outwardly from gear box 50 and is rotatably mounted on its outer end within side plate 12 as shown in FIGURE 1. The outer end of jack shaft 58 extends through the plate 12 and a sprocket gear 60 is secured to the extreme outer end of the shaft 58. An idler gear 62 is rotatably mounted by conventional means to the side plate 12 at a point substantially rearwardly of the sprocket gear 60 and in alignment with the sprocket gear 60. One end of the shaft 37 and 48 upon which the upper and lower rolls 36 and 46, respectively are mounted, extend through plate 12. Sprocket gear 64 is secured to the outer end of shaft 37 and sprocket gear 66 is secured to the outer end of shaft 48. A sprocket gear chain 67 extends substantially horizontally rearwardly from the sprocket gear 60 on jack shaft 58 to the idler gear 62. The chain 67 then extends downwardly around the sprocket gear 67 on shaft 37 and thence upwardly and forwardly over the top of sprocket gear 66 on shaft 48. The chain 67 then extends upwardly and around the sprocket gear 60 to the point of beginning. Thus, the rotation of power take-off shaft 56 imposes rotational power to jack shaft 58 through universal joint 54, imput shaft 52 and gear box 50. Rotational power is thereupon imparted to the upper and lower rolls 36 and 46, respectively, by the sprocket chain 67 which interconnects the sprocket gears on the ends of the jack shaft 58 and the shaft 37 and 48.

With reference to FIGURE 1, a bearing block 68 is pivotally connected by any convenient means to the upper forward portion of side plates 12 and 14. A crank 70 threadably extends through blocks 68 and threadably terminates within a block (not shown) which is rigidly secured within one end of spring 72. The other end of spring 72 is secured by any convenient means to the lip 34 which extends upwardly from the bearing plates 32. The rotation of crank 70 causes the bearing plates 32 to rotate about shaft 30 which in turn serves to adjust the positional relationship between the upper roll 36 and the lower roll 46. In effect, the adjustment of crank 70 in the manner described above tends to rotate the upper roll 36 either towards or away the lower roll 46, depending on the direction in which the crank 70 is rotated. In addition, if a large object such as a rock should inadvertently be passed between the upper and lower rolls, the upper roll would be forced to pivot slightly upwardly with the bearing plates 32 about the bar 20, and this phenomenon is permitted by means of the resiliency of springs 72.

A block 74 is pivotally connected by any convenient means between ears 76 which are rigidly secured to tongue 22. Similarly, a block 78 is pivotally connected by any convenient means between the upper ends of arms 80 which are rigidly secured to bar 20. A crank 82 is threadably received in the blocks 74 and 78, and the rotation of the crank 82 serves to raise or lower the forward lower ends of the side plates 12 and 14 to effect the raising or lowering of the draper comb 84.

The draper comb 84 includes a forward roll 86 and a rearward roll 88 which are rotatably secured by their ends to side plates 90. A shaft 91 rigidly extends through the longitudinal axis of the rear roll 88 and is rotatably mounted on the forward lower ends of side plates 12 and 14. A continuous belt 92 extends around the rolls 86 and 88 and comb elements 94 are arranged in spaced apart rows across the width of the belt 92. Comb elements 94 are comprised of two spring fingers 96 which have their outer ends extending slightly upwardly from the plane of the belt 92. These spring fingers 96 are adapted to be deflected outwardly away from the surface of the belt at times. The spring fingers are secured to the belt by means of rivets 98 or the like.

The pitch or angle of the draper comb 84 can be selectively adjusted by means of the chains 100 and the hangers 102 which effect an adjustable connection between the forward ends of the side plates 90 and the bracket 28 on tongue 22. The screw handles 103 on the hangers 102 can be operated in conventional fashion to raise or lower the hangers, and different lengths of chains 100 can be secured to the lower ends of the hangers to effect the same purpose.

A sprocket gear 104 is secured to one end of the shaft 91 that extends through the rearward roll 88 of draper comb 84. A sprocket gear 106 is rigidly secured to the end of shaft 37 which is opposite to sprocket gear 64. A gear chain 108 interconnects the sprocket gears 104 and 106 and thus, rotational movement of the belt 92 on draper comb 84 is achieved by the rotation of the upper roll 36 in the manner described above, which in turn imparts rotational movement to the roll 88 through the chain 108.

A cart 110 is comprised of a bottom 112, sides 114 and a rear 116. Caster wheels 118 are secured to the rearward bottom portions of the cart 110. Brackets 120 extend forwardly from the forward side edges of the cart 110 and the inverted U-shaped portions thereof are hooked upon the inwardly extending axle members 16 to effect the connection of the cart 110 to the frame 10. Obviously, any convenient means of securing the cart to the frame would suffice, and the only function of the cart is to receive the grain or leaves which are harvested.

An alternate form of the invention is shown in FIGURE 2 of the drawings. This embodiment is substantially identical to the structure described above, except that two continuous belts are used in place of the upper roll 36 and the lower roll 46. A roll 36A and a roll 36B are rotatably mounted between frame members, such as side plates 12 and 14, and rotational power is imposed upon one of these two rolls in any convenient manner, such as through the means that rotational power is imposed upon the upper rolls 36 as described above. A continuous belt 38A extends around rolls 36A and 36B, and the belt 38A utilizes the same mat 38 with the spaced apart rows of fingers 40 which were present on the peripheral surface of the upper roll 36. Rolls 46A and 46B are disposed below and slightly rearwardly of the rolls 36A and 36B, and a continuous belt 46C with a smooth outer surface is mounted on the rolls 46A and 46B so that the outer surface of the belt 46C comes into contact with the extreme outer ends of the fingers 40, so that the positional relationship of the belt 38A and the belt 46C is the same as the positional relationships between the upper roll and the lower roll 46 which were described above.

The normal operation of the device of this invention is as follows: Rotational power is supplied to the upper roll 36, the lower roll 46, and the draper comb 84 in the manner described above so that each of these components experience movement in the direction shown by the arrows in FIGURE 9. The device is then pulled through the crop to be harvested in a forward direction by any convenient prime mover. The spring fingers 96 of the comb elements 94 tend to lift and straighten the stems or stalks of the growing crop to condition them for introduction between the upper and lower rolls 36 and 46, respectively. As the stems of the crop are untangled and straightened by the draper comb 84, the upper ends thereof are immediately received between the upper and lower rolls as indicated in FIGURE 9. The stems of the plants are not tightly bound between the upper and lower rolls, but the flexible resilient fingers on the upper roll tend to gently grasp each plant and strip the upper leaves or the grain on the upper end thereof from the plant. The smooth finish on the surface of the lower roll eliminates any tendency of the lower roll to frictionally attach any of the stalks to damage the stalk or pull it from the ground. The substantial space between the adjacent rows of fingers 40 eliminates the winding of the stem of the plant between adjacent rows of fingers. As the device of this invention passes over a given plant, the stem is gently withdrawn from its position between the rolls 36 and 46 because no binding relationship is experienced by the plant between these rolls. In the case of alfalfa leaves being harvested, the stems of the alfalfa plant are uninjured and the harvested plant is then permitted to have continued future growth.

The speed of rotation of the upper and lower rolls 36 and 46, respectively, tend to throw the harvested leaves or grain in a rearward direction into the cart 110. However, if any leaves or grain do tend to attach themselves to the fingers 40 of the upper roll 36, the brush 44 tends to clean this material from the fingers and force it downwardly into the cart 110.

As indicated above, the preferred positional relationships between the upper roll 36 and the lower roll 46 is illustrated in FIGURE 5, but if a given crop or if certain operating conditions would require a variation in this positional relationship, the crank 70 can be operated in the manner described above to effect this change.

Because the tongue 22 is elevated with respect to the frame 10 and the draper comb 84, substantial adjustments of the angular position of the draper comb can be effected to accommodate different crops and crops of different heights. It has been found that the elevated position of the tongue 22 greatly contributes to the success of the device of this invention.

The frictionless smooth surface of the lower roll 46 and the flexible space fingers 40 on the upper roll 36 greatly contribute to the successful release of the plant stems from the roll after the leaf stripping or grain stripping operation has taken place. The rounded or arcuate shape of the fingers 40 as illustrated in FIGURE 4 contribute to the ability of the fingers to avoid an undesirable snagging of the individual plants.

Thus, from the foregoing, it is seen that the device of this invention will accomplish at least all of its stated objectives.

Some changes may be made in the construction and arrangement of my harvesting device without departing from the real spirit and purpose of my invention, and it is my intention to cover by my claims, any modified forms of structure or use of mechanical equivalents which may be reasonably included within their scope.

I claim:

1. In a harvesting device adapted to strip leaves or grain from the stem of a growing plant without damaging the stem or removing the stem from the ground, comprising, a wheel mounted frame having forward and rearward ends, a first roll extending transversely across said frame and being rotatably mounted thereon, a plurality of resilient finger elements extending from said first roll and being arranged in closely spaced rows positioned in planes perpendicular to the axis of rotation of said first roll, a second roll extending transversely across said frame and being positioned adjacent the peripheral ends of said finger elements, and means for rotating at least said first roll whereby stems of growing plants passing under said wheel mounted frame will yieldably move between said rows of finger elements whereupon the leaves or grain on said stems can be stripped therefrom without damaging said stems and without removing said stems from the ground.

2. The device of claim 1 wherein said fingers are of a resilient material.

3. The device of claim 1 wherein a comb means is secured to said frame forwardly of said rolls to straighten the plants of the crop being harvested.

4. The device of claim 1 wherein a brush element is disposed on said frame in engagement with said finger elements.

5. The device of claim 1 wherein said first roll is positioned above and forwardly of said second roll.

6. The device of claim 1 wherein said first roll is of a greater diameter than said second roll.

7. The device of claim 1 wherein said frame means includes means for adjusting said first and second rolls with respect to each other.

8. The device of claim 1 wherein a comb means is secured to said frame forwardly of said rolls to straighten the plants of the crop being harvested, and a tongue means extends upwardly and forwardly from said frame, and said comb means is adjustably secured to said tongue and said frame.

9. The device of claim 1 wherein a comb means is secured to said frame forwardly of said rolls to straighten the plants of the crop being harvested; said comb means comprising a belt means with a plurality of resilient fingers secured thereto.

10. The device of claim 1 wherein a mat is secured to the perimeter of said first roll, and a plurality of fingers integral with said mat extend radially outwardly from said roll.

11. The device of claim 1 wherein means are provided for rotating both of said rolls simultaneously.

12. The device of claim 1 wherein said finger elements are disposed in spaced apart longitudinal rows.

13. The device of claim 1 wherein said finger elements radially extend from said first roll and are disposed in separate spaced apart rows, wherein said spaces are at least equal to the diameter of said fingers.

14. The device of claim 1 wherein said finger elements radially extend from said first roll and are disposed in separate spaced apart rows and the outer ends of said fingers are arcuate in shape.

15. The device of claim 1 wherein a collection receptacle is mounted on said frame rearwardly of said first roll.

16. In a harvesting device adapted to strip leaves or grain from the stem of a growing plant without damaging the stem or removing the stem from the ground, comprising, a wheel mounted frame having forward and rearward ends, a first roll means extending transversely across said frame and being rotatably mounted thereon; said first roll means including two spaced apart rolls with a continuous belt extending therearound with a plurality of resilient finger elements extending from said first roll and being arranged in closely spaced rows positioned in planes perpendicular to the axis of rotation of said two spaced apart rolls, a second roll means extending transversely across said frame and being positioned adjacent the peripheral ends of said finger elements, and means for rotating at least said first roll means whereby stems of growing plants passing under said wheel mounted frame will yieldably move between said rows of finger elements whereupon the leaves or grain on said stems can be stripped therefrom without damaging said stems and without removing said stems from the ground.

17. The device of claim 16 wherein said second roll means includes two spaced apart rolls with a continuous belt extending therearound.

18. The device of claim 16 wherein said finger elements are symmetrically positioned in uniform spacing throughout the outer surface of said mat.

References Cited

UNITED STATES PATENTS

| 1,255,209 | 2/1918 | Nelson | 56—130 |
| 1,590,174 | 6/1926 | Hall | 56—48 |
| 2,460,029 | 1/1949 | Ramp | 56—19 |

ANTONIO F. GUIDA, *Primary Examiner.*